US010984317B2

(12) United States Patent
Panciatici et al.

(10) Patent No.: US 10,984,317 B2
(45) Date of Patent: Apr. 20, 2021

(54) DATASET FOR LEARNING A FUNCTION TAKING IMAGES AS INPUTS

(71) Applicant: DASSAULT SYSTEMES, Velizy Villacoublay (FR)

(72) Inventors: Jeannine Panciatici, Velizy Villacoublay (FR); Maria Pumborios, Velizy Villacoublay (FR); Jonathan Cloux, Velizy Villacoublay (FR); Thibault Fourcaud, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/011,359

(22) Filed: Jun. 18, 2018

(65) Prior Publication Data
US 2018/0365565 A1    Dec. 20, 2018

(30) Foreign Application Priority Data

Jun. 16, 2017    (EP) .................................... 17305738

(51) Int. Cl.
| G06T 17/00 | (2006.01) |
| G06F 17/30 | (2006.01) |
| G06N 3/08 | (2006.01) |
| G06F 16/51 | (2019.01) |
| G06K 9/62 | (2006.01) |
| G06K 9/00 | (2006.01) |

(52) U.S. Cl.
CPC .............. *G06N 3/08* (2013.01); *G06F 16/51* (2019.01); *G06K 9/6255* (2013.01); *G06T 17/00* (2013.01); *G06K 9/00201* (2013.01)

(58) Field of Classification Search
None
See application file for complete search history.

(56) References Cited

U.S. PATENT DOCUMENTS

| 2013/0151452 A1* | 6/2013 | Wang ...................... G06N 5/02 706/46 |
| 2017/0330075 A1* | 11/2017 | Tuysuzoglu ............. G06N 3/08 |
| 2018/0276500 A1* | 9/2018 | Yamada ................ G06K 9/6256 |

OTHER PUBLICATIONS

Feiwei Qin et al, "An ontology-based semantic retrieval approach for heterogeneous 3D CAD models", Advanced Engineering Informatics, vol. 30, Issue 4, Oct. 2016, pp. 751-768, https://www.sciencedirect.com/science/article/pii/S1474034616300891 (Year: 2016).*

(Continued)

*Primary Examiner* — Tize Ma
(74) *Attorney, Agent, or Firm* — Oblon, McClelland, Maier & Neustadt, L.L.P.

(57) ABSTRACT

The disclosure notably relates to a computer-implemented method for forming a dataset. The dataset is configured for learning a function. The function takes as inputs images of instances of one or more classes of real objects. The method comprises, for each class, providing a parametric model of the class, generating a plurality of 3D modeled objects with the parametric model, and adding to the dataset, for each one of the plurality of 3D modeled objects, one or more corresponding images. The generating includes traversing one or more of the set of ranges. The method constitutes an improved solution for forming a dataset configured for learning a function.

16 Claims, 10 Drawing Sheets

(56) References Cited

OTHER PUBLICATIONS

Office Action dated Feb. 15, 2018, in European Patent Application No. 17305738.1-1207 (13 pages).
Hang Su, et al.; "Multi-view Convolutional Neural Networks for 3D Shape Recognition"; 2015 IEEE International Conference on Computer Vision (ICCV), IEEE, Dec. 7, 2015; XP032866419; 9 pages.
Rodrigo Ortiz-Cayon, et al.; "Automatic 3D Car Model Alignment for Mixed Image-Based Rendering", 2016 Fourth International Conference on 3D Vision (3DV), IEEE; Oct. 25, 2016; XP033027635; 10 pages.
Office Action dated Nov. 27, 2017, in European Patent Application No. 17 305 738.1-1901 (5 pages).
Christoph M. Hoffman, et al.; "Parametric Modeling"; 23 pages.
Donald E. LaCourse; "Handbook of Solid Modeling"; 13 pages.
Vincent Cheutet, et al.; "Constant Modeling for Curves and Surfaces in CAGD: A Survey"; HAL Id: hal-00118989; http://hal.archives-ouverte.fr/hal-00118989; Dec. 7, 2006; 36 pages.
Yu Xiang, et al.; "ObjectNet3D: A Large Scale Database for 3D Object Recognition"; 16 pages.

* cited by examiner

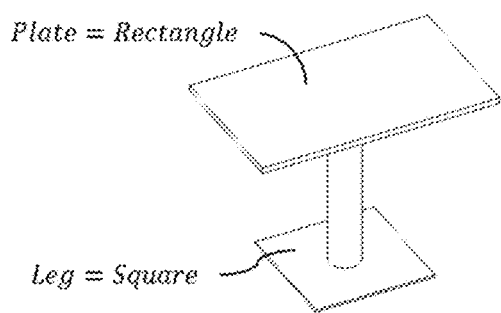
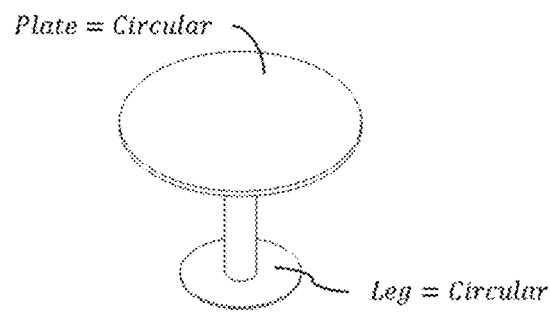
FIG. 9   FIG. 10
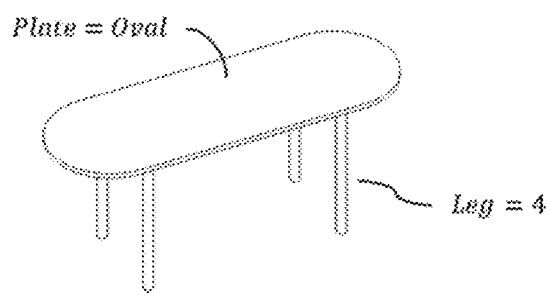
FIG. 11
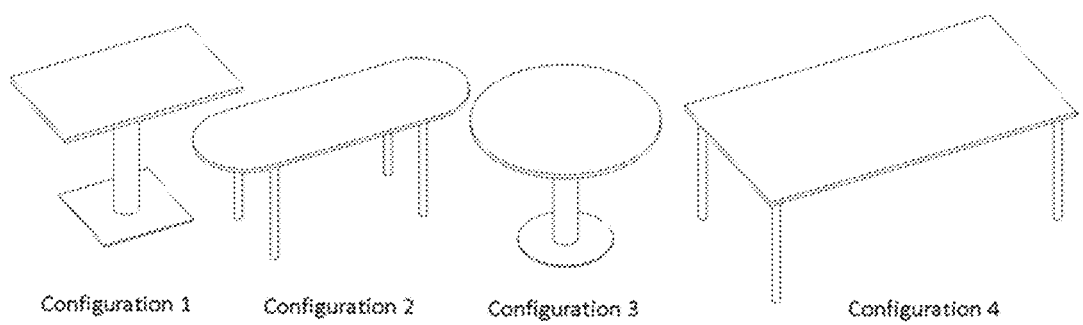
FIG. 12

US 10,984,317 B2

DATASET FOR LEARNING A FUNCTION TAKING IMAGES AS INPUTS

CROSS-REFERENCE TO RELATED APPLICATIONS

This application claims priority under 35 U.S.C. § 119 or 365 to European Application No. 17305738.1 filed on 16 Jun. 2017. The entire contents of each of the above applications are incorporated herein by reference.

FIELD OF THE INVENTION

The invention relates to the field of computer programs and systems, and more specifically to methods, systems and programs related to forming a dataset configured for learning a function, the function taking as inputs images of instances of one or more classes of real objects.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, the machine-learning of functions taking as inputs images is gaining more and more importance.

For example, artificial neural networks (also more simply referred to as "neural networks") designed to recognize three-dimensional (3D) objects from two-dimensional (2D) images are being developed. As for other machine-learnt functions, such artificial neural networks have to be trained before use. The training is performed with a sample of training patterns also referred to as "training/learning dataset" or more simply "dataset".

A neural network is defined by two features: topology and weights. The topology is a system of connected computing units. Each computing unit outputs a weighted combination of its input numerical data and sends this result to neighboring computing units according to the directed connections. The data flow runs from initial units fed by initial data down to terminal units, which yields the output numerical result. Numerical combinations are performed by using these numerical coefficients called weights. Initially, the weights' values are unknown and they need to be adjusted according to the neural network purpose: for example recognize 3D objects from 2D images. This adjustment step is named the training or learning. In order to train the neural network, the dataset of training patterns is used. A training pattern is a pair of consistent input and output data. Using this information, dedicated algorithms are able to compute weights values.

A bottleneck of the training process is an appropriate dataset of training patterns. It may be numerous and precise so that the neural network is robust and accurate.

In existing solutions, the dataset of training patterns is generally prepared by users looking at images and being involved for recognizing which objects are on the images. This is how datasets were built such as ImageNet (which is a dataset of 2D images accessible at the following URL at the priority date: www.image-net.org), ShapeNet (which is a dataset of 3D modeled objects accessible at the following URL at the priority date: www.shapenet.org) and ObjectNet3D (described in the following paper: Yu Xiang, Wonhui Kim, Wei Chen, Jingwei Ji, Christopher Choy, Hao Su, Roozbeh Mottaghi, Leonidas Guibas, and Silvio Savarese, *ObjectNet3D: A Large Scale Database for 3D Object Recognition*, Stanford University).

Within this context, there is still a need for an improved solution for forming a dataset configured for learning a function taking images as inputs.

SUMMARY OF THE INVENTION

It is therefore provided a computer-implemented method for forming a dataset. The dataset is configured for learning a function. The function takes as inputs images of instances of one or more classes of real objects. The method comprises, for each class, providing a parametric model of the class, generating a plurality of 3D modeled objects with the parametric model, and adding to the dataset, for each one of the plurality of 3D modeled objects, one or more corresponding images. The parametric model includes a set of ranges each of a respective one of a set of parameters. The parametric model is configured to generate a respective 3D modeled object with a respective set of values provided in the set of ranges. The generated 3D modeled object represents a respective instance of the class. The generating includes traversing one or more of the set of ranges.

Such a method allows forming in an improved manner a dataset configured for learning a function that takes as inputs images of instances of one or more classes of real objects.

Notably, once for each class a parametric model of the class is provided, the method may easily generate for each such class a plurality of objects each corresponding to a respective instance of the class, so as to populate the dataset. The method thereby allows synthetically building the dataset, in a relatively short and easy way, also avoiding human mistakes and thus leading to a precise dataset, an efficient learning and an accurate learnt function. Furthermore, the use of a parametric model allows the method to populate the dataset with arbitrarily diverse data, by being allowed to contemplate providing any arbitrary values to the parameter ranges. The method in specific includes, at the generating, traversing one or more of the set of ranges. The dataset formed by the method is thereby relatively diverse and exhaustive with respect at least to the parameters corresponding to said traversed ranges. This again increases efficiency of the learning and accuracy of the learnt function. Now, thanks to the parametric model of each class being configured to generate objects which are 3D modeled objects in specific, the method allows populating the dataset with images which relatively accurately represent instances of the class, as the 3D modeled object representation is itself a relatively detailed and exhaustive representation of a real object. This yet increases efficiency of the learning and accuracy of the learnt function.

In examples, the method may comprise one or more of the following:
- the adding comprises, for each respective one of the plurality of 3D modeled objects, determining the one or more corresponding images based on the respective 3D modeled object;
- for each respective one of the plurality of 3D modeled objects, the added corresponding images comprise or consist of one or more 2D images and/or a 3D modeled object derived from the respective 3D modeled object itself;
- each added 2D image is determined by extracting a respective 2D view from the respective 3D modeled object, for example a 2D rendering of the respective 3D modeled object;
- the 3D modeled object derived from the respective 3D modeled object itself is the respective 3D modeled object itself or a 3D modeled object derived from the 3D modeled object;
- the extraction is fully-automatic;
- the function has a domain (or input set) and a codomain (or output set), and the method comprises adding training patterns to the dataset, each training pattern including an element of the domain and an element of the codomain, the adding of images being included in the adding of training patterns, each added image being an element of a respective added training pattern;
- the adding of training patterns includes, for each training pattern, forming the elements of the training pattern and linking the elements of the training pattern together;
- the linking of the elements of the training pattern is performed fully automatically and/or excluding any human manual recognition; the method is thereby not only shorter and easier to execute than prior art methods, but it also allows avoiding mistakes related to human recognition, thus forming a dataset which has a relatively high precision and may thus lead to a relatively accurate function if learnt on the dataset;
- each training pattern includes a respective first element corresponding to the domain of the function and which is an added image and a respective second element corresponding to the codomain of the function and which is another piece of data providing information relative to the instance represented by the 3D modeled object that corresponds to the added image;
- the second element of each training pattern comprises or consists of one or more other images (such as the 3D modeled object that corresponds to the added image itself) and/or any other type of information relative to the instance represented by the 3D modeled object that corresponds to the added image, such as information indicative of the class of the instance represented by the 3D modeled object that corresponds to the added image (such as text providing a name of the class and/or a label of the class);
- the first element of each training pattern is a 2D image and the second element is a corresponding generated 3D modeled object and/or information indicative of the class of the instance represented by said corresponding generated 3D modeled object and by said 2D image (such as text providing a name of the class and/or a label of the class); in such a case the function is configured to output a 3D modeled object corresponding to an input 2D image and/or recognize and output the class of a real object instance represented in an input 2D image;
- the first element of each training pattern is a generated 3D modeled object and the second element is information indicative of the class of the instance represented by the 3D modeled object (such as text providing a name of the class and/or a label of the class); in such a case the function is configured to recognize and output the class of a real object instance represented in an input 3D modeled object;
- the set of parameters includes one or more characteristic parameters;
- the one or more of the set of ranges that are traversed are each of a respective characteristic parameter;
- the one or more characteristic parameters of which ranges are traversed include style parameters;
- the one or more characteristic parameters further include one or more dimensional parameters, the generating including sampling the ranges of the one of more dimensional parameters;
- the generating includes randomizing other one or more of the set of ranges;
- the randomizing includes, for each combination of values of the one or more of the set of ranges that are not randomized, providing a number of combinations of random values for the randomized ranges, the number of combinations being predetermined to the class;
- the parametric model further includes one or more constraints each linking respective parameters together; and/or
- the generating is performed according to an ordering defined on the set of parameters giving priority to the one or more of the set of ranges that are traversed and based on the one or more constraints.

It is further provided a computer-implemented method for defining a parametric model of a class of real objects. The method comprises defining a set of parameters and, for each parameter, a respective range. The definition is such that the parametric model is configured to generate a respective 3D modeled object that represents a respective instance of the class with a respective set of values provided in the set of ranges. The method also comprises labeling one or more ranges as to be traversed when forming the dataset. Such a method allows defining parametric models configured and ready for applying the method for forming a dataset.

In examples, the method for defining a parametric model may comprise one or more of the following:
- the set of parameters includes one or more characteristic parameters;
- the one or more of the set of ranges that are traversed are each of a respective characteristic parameter;
- the one or more characteristic parameters of which ranges are traversed include style parameters;
- the one or more characteristic parameters further include one or more dimensional parameters;
- the method further comprises defining a number of combinations of random values for randomized ranges, the number of combinations being predetermined to the class;

the method further comprises defining one or more constraints each linking respective parameters together; and/or the method further comprises defining an ordering on the set of parameters giving priority to the one or more of the set of ranges that are traversed and based on the one or more constraints.

It is further provided a computer-implemented method for learning (i.e. training) a function based on a dataset formed by the method for forming a dataset. The method comprises providing a function architecture (or topology), such as the topology of a weighted neural network, that is with undefined values for the weights. The function architecture is a data structure that may be adjusted so as to provide functions each taking as inputs images of instances of one or more classes of real objects. The method also comprises providing the dataset, and then adjusting the function architecture to match the dataset, for example by minimizing a predetermined loss term. The adjusting may consist in adjusting weight values of the neural network. Such a method is referred to as the offline learning/training part of a machine-learning process.

It is further provided a computer-implemented method for using a function learnt by such a method for learning. The method comprises providing the function. The method then comprises providing one or more input images, for example of instances of the one or more classes of real objects which the function is configured to take as inputs (the method handling in any way the case where the input images are not of instances of said one or more classes), and then applying the function to the one or more input images. The method may then comprise any post-processing of the output. Such a method is referred to as the online (or inline) part of a machine-learning process.

It is further provided a process comprising any sequence of the above methods. The sequence may be performed at same location and/or by a same system, or including exchanges of data between distant systems.

It is further provided a computer program comprising instructions for performing any one or any combination of the above methods.

It is further provided a dataset formable by the method for forming a dataset. Such a dataset comprises the one or more corresponding images added by the method, the dataset being thereby relatively more exhaustive and accurate than existing similar datasets.

It is further provided a parametric model definable by the method for defining a parametric model. Such a parametric model comprises all information defined during the method for defining a parametric model, and notably labels indicating that one or more respective ranges are to be traversed when forming the dataset.

It is further provided a data structure comprising the dataset, the function and/or the program.

It is further provided a device comprising a data storage medium having recorded thereon the data structure. The device may form a non-transitory computer-readable medium. The device may alternatively comprise a processor coupled to the data storage medium. The device may thus form a system. The system may further comprise a graphical user interface coupled to the processor.

BRIEF DESCRIPTION OF THE DRAWINGS

Embodiments of the invention will now be described, by way of non-limiting example, and in reference to the accompanying drawings, where:

FIGS. 4, 5, 6, 7, 8, 9, 10, 11, 12, 13, 14, 15, 16, 17, 18, 19, 20, 21 and 22 illustrate implementations of the methods.

DETAILED DESCRIPTION OF THE INVENTION

Figure 1:
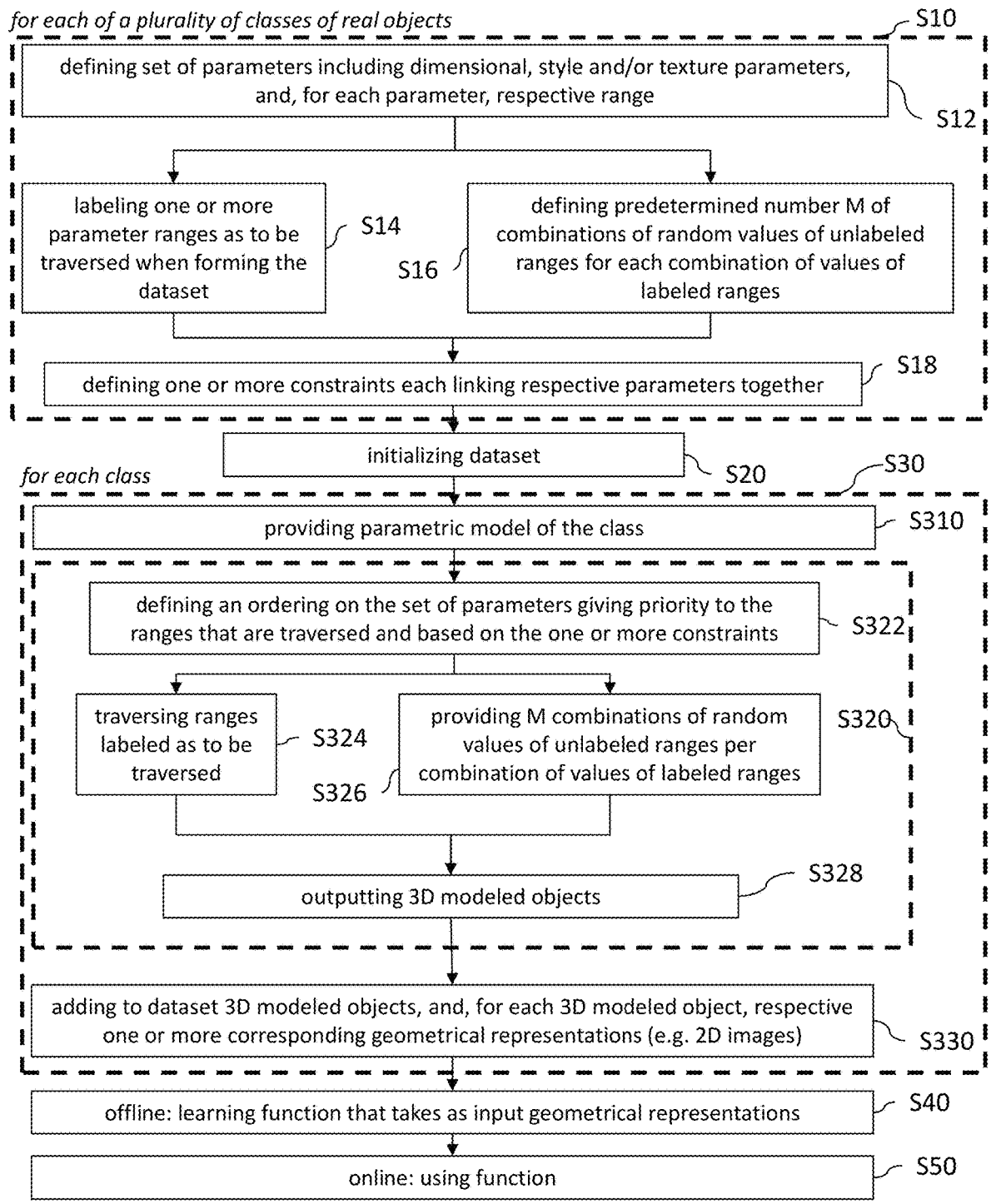
FIG. 1 shows a flowchart of an example of the process.

The function is any function, such as a neural network, which takes as inputs images potentially of instances of one or more classes of real objects and produces for each input a respective output which may be of any format.

An image is a data structure that represents a spatial distribution of a physical signal. An image of a real object represents distribution of the physical signal on the object, for example located in a scene. The spatial distribution may be of any dimension, for example 2D or 3D. The physical signal may be any signal, for example color, level of gray, depth or presence of material or object boundary. Correspondingly, the image may be a 2D or a 3D RGB, grayscale or depth image, a 2D contour model or yet a 3D modeled object (e.g. a surface occupancy or volume occupancy model, or yet a boundary representation).

The spatial distribution may be represented in any way, for example with a grid of values and thereby defining pixels or voxels, the grid being possibly irregular or regular. The images added to the dataset and/or to be inputted to the function may all be a of a same type, for example all rectangular 2D RGB or grayscale images or all 3D modeled objects. Alternatively, the images added to the dataset and/or to be inputted to the function may comprise different types of images (e.g. even among first elements or among second elements of training patterns).

In examples, the function is configured to output information indicative of the class of a real object instance represented by an input image, such as a 2D image or a 3D modeled object. In other examples, the function is configured to output a 3D modeled object of a real object instance represented by an input image, such as 2D image.

A modeled object is any object defined by data stored e.g. in the database. By extension, the expression "modeled object" designates the data itself. According to the type of the system at use, a modeled object may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task).

The expression "class of real objects" designates a collection, group or category of real objects that can be described by a same semantic descriptor. A semantic descriptor of a class of real objects is an expression that comprises natural language words and optionally numbers to describe any object of the class. A class may gather any type of real objects. A subclass of a class may itself be considered as a class. The methods may contemplate any granularity for the classification, depending on the precision contemplated for the function to be learnt. The methods may for examples contemplate classes identified in ImageNet, ShapeNet or ObjectNet3D.

The methods may contemplate classes of animals, classes of body organ parts or classes of plants/trees, or yet classes of products such as classes of (e.g. mechanical) parts or assemblies of parts or more generally classes of any rigid body assembly (e.g. a mobile mechanism). The products may be used in various and unlimited industrial fields, including: aerospace, architecture, construction, consumer goods, high-tech devices, industrial equipment, transportation, marine, and/or offshore oil/gas production or transportation. The methods may contemplate classes of industrial products which may include any mechanical part classes, such as terrestrial vehicle part classes (including e.g. car classes and light truck equipment classes, racing car classes, motorcycle classes, truck classes and motor equipment classes, trucks classes and bus classes, train classes), aerial vehicle part classes (including e.g. airframe equipment classes, aerospace equipment classes, propulsion equipment classes, defense product classes, airline equipment classes, space equipment classes), naval vehicle part classes (including e.g. navy equipment classes, commercial ship classes, offshore equipment classes, yacht classes and workboat classes, marine equipment classes), general mechanical part classes (including e.g. industrial manufacturing machinery classes, heavy mobile machinery classes or equipment classes, installed equipment classes, industrial equipment product classes, fabricated metal product classes, tire manufacturing product classes), electro-mechanical classes or electronic part classes (including e.g. consumer electronics classes, security classes and/or control classes and/or instrumentation products classes, computing and communication equipment classes, semiconductor classes, medical device and equipment classes), consumer good classes (including e.g. furniture classes, home and garden product classes, leisure good classes, fashion product classes, hard goods retailers' product classes, soft goods retailers' product classes), packaging classes (including e.g. food and beverage and tobacco, beauty and personal care, household product packaging classes).

An element of the class is called "instance". An instance is thus a real object of the class. An instance has different physical characteristics, e.g. including its style, its dimensions and/or its texture. An instance of a class may be represented by a 3D modeled object that models such information.

A parametric model (also known as "template") of a class is a function that generates (i.e. outputs) a 3D modeled object representing an instance of the class with values provided for input parameters (one value per each parameter). Each such generated 3D modeled object thus corresponds to a respective set of parameter values provided for the parametric model. Each parameter corresponds to a range, that is, the set of all authorized values for the parameter. A parametric model may further include one or more constraints each linking respective parameters together (in other words, constraining values of one or more parameters relative to values of one or more other parameters). Such information is provided together with the parametric model.

The method for forming the dataset then includes traversing (e.g. fully) one or more ranges during the generation of 3D modeled objects. The term "traversing" for a range means that each value of at least a representative subset of the range (i.e. a set of values of the range distributed over the whole range) is visited during the generation, such that for each value of the subset at least one corresponding 3D modeled object is generated. The other parameter values corresponding to said 3D modeled object may be set in any way, examples being provided later. Each such generated 3D modeled object may then lead to corresponding one or more training patterns in the dataset. This allows the dataset to be comprehensive and various with respect to the traversed parameter range(s). In other words, all the combinations of values of the traversed ranges are represented in the dataset.

The set of ranges may include one or more ranges that are finite. Traversing such finite ranges may amount to visit all values of the range. In such a case, the representative subset of the range is the whole range itself. The set of ranges may include one or more ranges that are infinite. Such infinite sets may be sampled e.g. into finite sets. Finite sets may also be sampled, for example if relatively large. In such cases, the representative subset of the range is the result of the sampling. Such sampling may also be implemented and used for other steps of the method for forming the dataset: for example, when values of untraversed ranges are required (e.g. when randomized, as later described), such values may be selected within the result of the sampling. The sampling may be performed at the time of defining the parametric model, or during the formation of the dataset before or at the time of generating a plurality of 3D modeled objects (in which case the sampling is merely underlying the range). The sampling may be regular or irregular. The sampling may correspond to a predetermined number of steps or to a predetermined step size, which may constant or depend on the range and/or parameter. The sampling may lead to at least two or three values in the range, for example at least five or ten values. In the following, the processing of a range may refer to the processing of its sampled version.

The set of parameters may include one or more characteristic parameters. A characteristic parameter is a parameter that represents a discriminative feature of a real object of the class. The discriminative feature may correspond to a semantic descriptor. A semantic descriptor of a discriminative feature of a real object of a class is an expression that comprises natural language words and optionally numbers to describe an aspect of the real object, allowing to discriminatively compare the real object to other instances of the class. The parametric model thereby allows generating instances of the class that may be discriminated, and the formed dataset may translate such diversity.

The characteristic parameters may include style parameters, dimensional parameters and/or texture parameters. A style parameter is a parameter that represents shape or arrangement information relative to a real object of the class and thereby corresponds to a geometrical impression relative to the real object, notably when visualizing an image thereof. A style parameter thus forms an efficient way to discriminate between different instances of a class. A style parameter may represent the shape of the object, the shape of an element thereof, or an arrangement of elements thereof, all within a predetermined set of values. A dimensional parameter represents a dimension of a real object or of a part thereof. A texture parameter represents a texture of a real object or of a part thereof, the term "texture" covering for example a distribution of color, material, and/or touch feature (such as rugosity or smoothness).

The classes of real objects for which a parametric model is provided may include classes of assemblies of (e.g. mechanical) parts or products of a same type. The parametric model of such a class may comprise sub-models each respective to a part or product. Each sub-model is a parametric model that may comprise one or more style parameters e.g. each providing a finite set of shape types of the part, one or more dimensional parameters e.g. each providing an infinite set of values (for example of the type [a,b] where a and b are positive real numbers), and/or one or more texture parameters e.g. each providing a finite set of material types of the part, a finite set of touch feature types of the part, or a finite or infinite set of values of colors for the whole part (for example an RGB value, e.g. in a 257*257*257 set of values), or each defining or participating with other parameters to define—e.g. via tuning—a finite or infinite set of values of colors (for example an RGB distribution map on the part) or a finite or infinite set of values of touch feature (for example a distribution map of level of touch features on the part). The parametric model of the class may then further comprise style parameters e.g. each providing a finite set of arrangements of the parts. The parametric model of the class may also comprise dimensional parameters e.g. each providing, for a given arrangement between several parts, exact values of the relative positioning between the parts. The parametric model of the class may comprise other parameters.

The one or more classes for which a parametric model is provided may be sub-classes of an upper class of such kind. The parametric model of the upper class may then be defined as consisting of the set of parametric models of the one or more classes, to which a parameter is added for selecting one of said parametric models of the one or more classes. The concept of upper class may allow defining classes more easily, as different classes which are sub-classes of a same upper class may share parameters. Defining an upper class may then allow declaring such parameters only once, and then instantiation sub-classes which automatically inherit of said shared parameters, but may differ in the functions they apply to said shared parameters.

The one or more of the set of ranges that are traversed may each be a range of a respective characteristic parameter. In such a case, the dataset is comprehensive with respect to characteristic parameters, and the diversity of the dataset allows later learning a function which operates a discrimination in line with the characterization offered by the characteristic parameters. In other words, the function will be more robust to mistaking one instance with another relative to the traversed characteristic parameters.

Such traversed characteristic parameters may include style parameters (e.g. all style parameters provided by the parametric model). Style parameters are indeed particularly discriminative. Diversity with respect to the values taken by style parameters is thus of particular interest. This is all the more true in the case of classes of assemblies of (e.g. mechanical) parts or products of a same type.

In examples, all style parameters are traversed and all other parameters are randomized. This allows a fast formation of the dataset, yet diverse with respect to style, which is the most discriminative type of parameters in many contexts, including the mechanical engineering context.

The methods are computer-implemented. This means that the steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the methods is to perform the methods with a system adapted for this purpose. The system may comprise a processor coupled to a memory and a graphical user interface (GUI), the memory having recorded thereon a computer program comprising instructions for performing the methods. The memory may also store a database. The memory is any hardware adapted for such storage, possibly comprising several physical distinct parts (e.g. one for the program, and possibly one for the database). The system may further comprise a depth sensor coupled to the processor and configured to acquire a depth map of an instance for the 3D reconstruction. The system may also comprise a posing spot for the instance to pose during the acquisition.

FIG. 1 shows a flowchart of an example of the process. Blocks S10, S20, S30, S40 and S50 may each be performed independently of other blocks.

The process of FIG. 1 comprises for each of a plurality of classes of real object a method for defining S10 a parametric model of the class, which may be performed via-user-interaction.

The defining S10 comprises defining S12 a set of parameters and, for each parameter, a respective range. The parameters may include dimensional, style and/or texture parameters. The parametric model expresses the variability of the real object instances of the class.

The defining S10 further includes labeling S14 one or more parameter ranges (equivalently, parameters) as to be traversed when forming the dataset. The range parameters thereby labeled may include (e.g. all) style parameters (e.g. which are finite), and possibly dimensional parameters and/or texture parameters (e.g. infinite ranges of such dimensional/texture parameters being in such a case sampled to become finite and traversable, which is not represented on the figure).

The process of FIG. 1 considers all other (i.e. unlabeled) ranges as to be randomized. Alternatively, the system may manage a specific label for "untraversed" ranges. Also, instead of a randomizing, any other processing different from a traversing may be contemplated for unlabeled ranges.

The defining S10 further comprises defining S16 a predetermined number M of combinations of random values of unlabeled ranges for each combination of values of labeled ranges. In other words, for each class, the process knows exactly how many combinations of random values it is supposed to draw for unlabeled ranges, per combination of traversed values of labeled ranges. The process is thereby asked to form a dataset expressing the whole diversity of combinations of traversed ranges, and to be "loser" (i.e. less "strict") on other ranges. The defining S16 yet allows a minimal diversity for randomized ranges, corresponding to the predetermined number M. The predetermined number M may be any positive integer value, for example inferior to 30 or 20. This allows reducing combinatorial costs.

The defining S10 further comprises defining S18 one or more constraints each linking respective parameters together. Alternatively, the user may well define no constraints.

Although represented sequentially, S12-S18 may be executed in any order, for example interlaced.

The process of FIG. 1 then initializes S20 a dataset.

The process of FIG. 1 then populates S30 the dataset class-by-class.

For each class, the process comprises providing S310 the parametric model of the class. The process then generates S320 a plurality of 3D modeled objects with the parametric model.

The generation S320 comprises defining a S322 an ordering on the set of parameters. The ordering gives priority to the ranges that are traversed and is based on the one or more constraints. The ordering may be determined automatically, in any way. Implementations of such an ordering are provided later. Alternatively to the example of FIG. 1, the ordering may be defined within S10 and be provided as such at S30, forming together with the parametric model. Yet alternatively, S30 may be based on no ordering and simply execute via heuristics.

The generation S320 then comprises traversing S324 ranges labeled as to be traversed. During the traversal S324, for each combination of values of labeled ranges, the generation S320 provides S326 M combinations of random values for unlabeled ranges. In alternatives, no predetermined number M is provided to the process which thus handles the randomizing in any way.

S324-S326 thereby lead to a diversity of 3D modeled objects outputted at S328. The output comprises 3D modeled objects corresponding to all possible combinations of values for labeled ranges, and for each such combination, to one or more (depending on the value of M) random combinations of values for unlabeled ranges.

The dataset is then populated for the class by adding S330 data based on the result of S328. For example, each respective 3D modeled object outputted at S328 is used to extract several 2D images, and each 2D image is added at S330 to the dataset linked with e.g. the respective 3D modeled object or any other related data so as to form a training pattern. Alternatively, each respective 3D modeled object outputted at S328 is added at S330 to the dataset linked with the name of the class so as to form a training pattern. S330 may be performed in any way, based on the type of function(s) that one wants to later learn at S40 based on the dataset.

In any case, the traversal S324 leads to a level of diversity in the dataset which allows an efficient learning S40, and thus to accurate results when later using at S50 such learnt function.

The defining S10 of the example further includes defining S16 a predetermined number M of combinations of random values for randomized ranges for each combination of values of the ranges that are not randomized.

Figure 2:
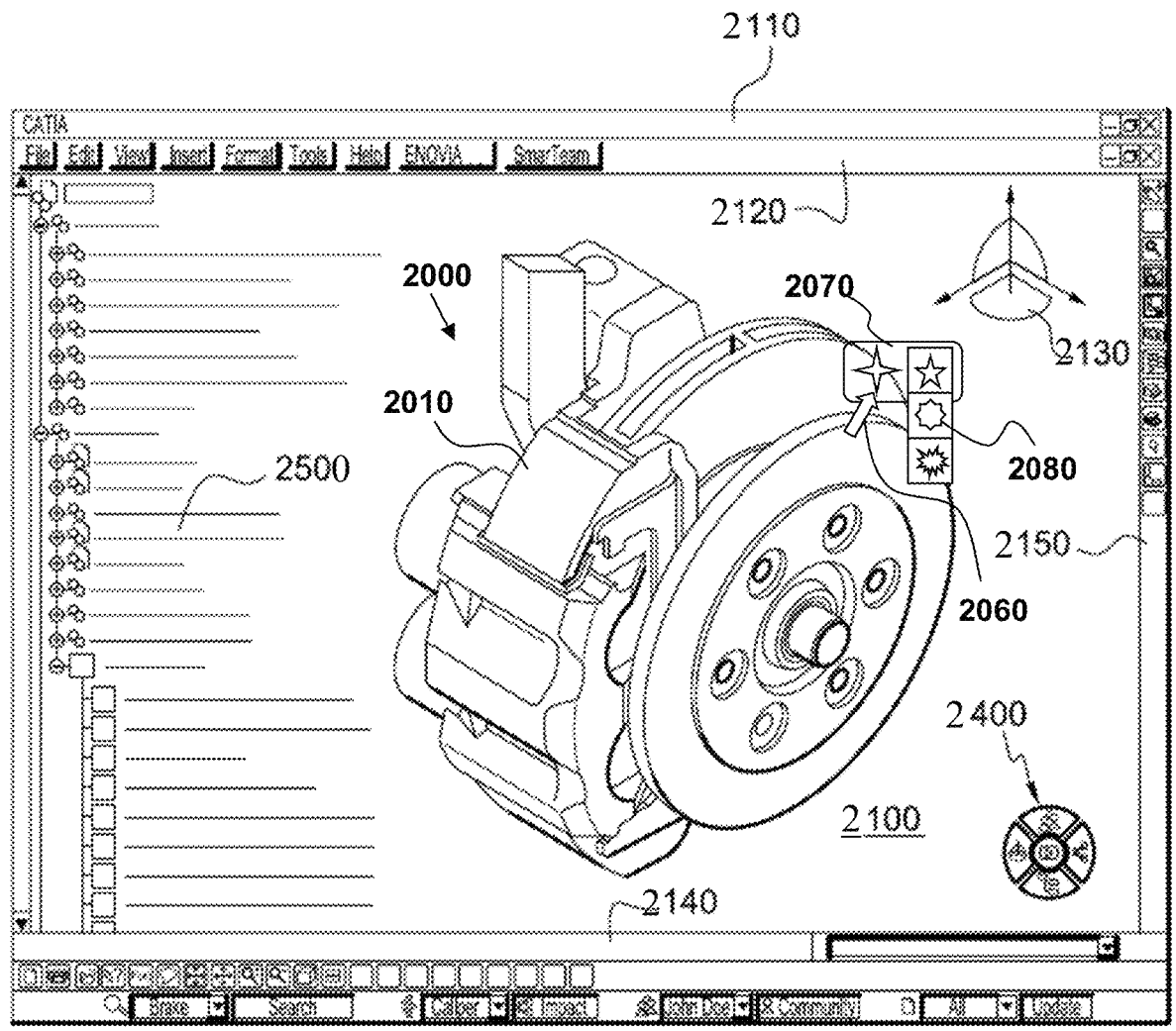
FIG. 2 shows an example of a graphical user interface of the system.

FIG. 2 shows an example of the GUI of the system, wherein the system is a CAD system. The GUI 2100 may be used to display a 3D modeled object 2000 of a given class, for example before defining a parametric model of the class, before applying a learnt function that takes as input such a 3D modeled object, or as a result of a learnt function that outputs such a 3D modeled object.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
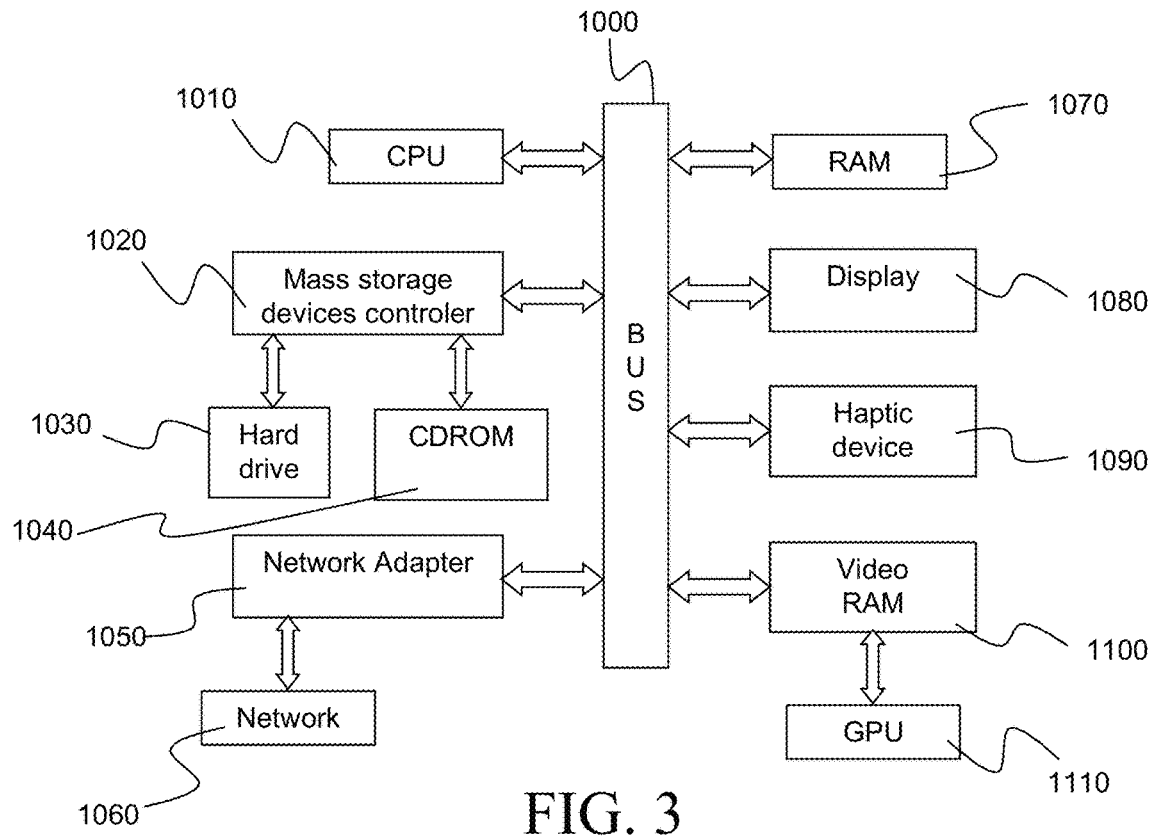
FIG. 3 shows an example of the system.

FIG. 3 shows an example of the system, as computer system connected to a depth sensor.

The system of the example comprises a central processing unit (CPU) 1010 connected to an internal communication BUS 1000, a random access memory (RAM) 1070 also connected to the BUS. The system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The system may also include a depth sensor 1090.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The process may allow to prepare training patterns, e.g. in order to train a neural network that is dedicated to recognize 3D objects by using 2D images. The process makes use of templates, which is a very popular concept in CAD. The principle may be to use a CAD system to create a parameterized template of the class of 3D objects to recognize. Each element of the class is obtained by instantiating the parameters (e.g. angular dimension, length dimension, texture). Thus, by automatically varying parameters values, a very large set of 3D models may be created. Then, for each model, another very large set of associated 2D images may be computed by using the CAD system again. The process may be able to provide several thousands of training patterns which are totally under control, notably from the geometrical point of view. This allows a neural network training which is efficient and safe.

Example implementations of the methods are now discussed with reference to FIGS. 4-22. The term "user" refers to the designer of the training patterns data base.

Example of Neural Network Definition

A neural network may be formally defined by a six-tuple $N=(X,U,\alpha,\omega,w,f)$ where X is the set of neurons, U is the set of directed connections, mapping $\alpha:U \to X$ describes start neurons of connections, mapping $\omega:U \to X$ describes end neurons of connections, the weight mapping $w:U \to \mathbb{R}$ associates a numerical weight to each connection and $f:\mathbb{R}[-1,1]$ is named the activation function.

This means that the start neuron of connection $u \in U$ is $\alpha(u)$, its end neuron is $\omega(u)$ and its weight is $w(u)$. Furthermore, the set of input connections of neuron $x \in X$ is $\omega^{-1}(x)$ and the set of output connections of neuron $x \in X$ is $\alpha^{-1}(x)$. Similarly, an inward neuron y of neuron x is the start neuron of an input connection of x, that is $y \in \alpha(\omega^{-1}(x))$. The topology of the neural network is defined by neurons and connections $(X,U,\alpha,\omega)$.

By definition, the activation function captures the nonlinear threshold effect of information propagation within the network. As described in textbook "Kriesel David, A brief introduction to Neural Networks, 2006", a typical activation function is $$f(t) = \frac{1}{1+e^{-t}}.$$

From the mathematical point of view, a neural network may be a directed graph with weighted arcs that is associated with an activation function.

By definition, an input neuron x has no input connections, meaning that $\omega^{-1}(x)=\emptyset$ and an output neuron x has no output connection, meaning that $\alpha^{-1}(x)=\emptyset$.

Each neuron $x \in X$ behaves like a computing unit in the following meaning. An output numerical value $\varphi(x)$ can be computed by combining numerical values of its inward neurons according to the following formula.

$$p(x) = \sum_{u \in \omega^{-1}(x)} w(u)\varphi(\alpha(u))$$

$$\varphi(x) = f(p(x))$$

Figure 4:
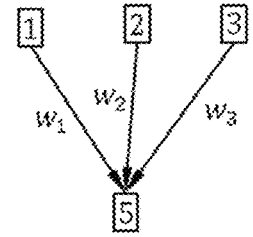

Value $p(x)$ is named the propagation value. It is the weighted sum of numerical values computed by start neurons $\alpha(u)$ of all connections u ending at neuron x. Value $\varphi(x)$ is the threshold effect $f(\bullet)$ applied at the propagation value $p(x)$. The formula is recursively defined and the ordering issue is addressed through the topology. FIG. 4 illustrates the computation at neuron 5 from its three inward neurons 1, 2 and 3.

A very popular topology of neural network that may be implemented by the process is the feed forward model. The set of neurons is structured as ordered disjoint subsets named layers $X=I \cup H_1 \cup \ldots \cup H_h \cup O$ where I is named the input layer (the layer of input neurons), $H_i$, $i=1, \ldots, h$ are named hidden layers and O is named the output layer (the layer of output neurons). There are connections from each neuron of layer I to all neurons of layer $H_1$. There are connections from each neuron of layer $H_i$ to all neurons of layer $H_{i+1}$ for $i=1, \ldots, h-1$. There are connections from each neuron of the last hidden layer $H_h$ to all neurons of output layer O. In the context of a feed forward neural network, a specific activation function can be associated with each layer.

Figure 5:
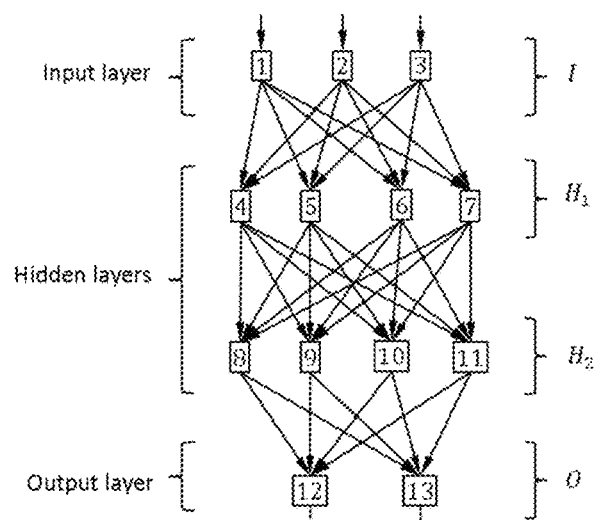

FIG. 5 illustrates a feed forward neural network featuring two hidden layers. Input neurons are symbolized with input arrow. Output neurons are symbolized with output arrows.

Clearly, the feed forward neural network is acyclic. So, setting numerical values $(t_x)_{x \in I}$ to input neurons, meaning that $\varphi(x):=t_x$ for all $x \in I$, and propagating the computation layer by layer yield numerical values $(z_y)_{y \in O}$ computed by output neurons. The mapping that computes $(z_y)_{y \in O}$ from $(t_x)_{x \in I}$ through the feed forward neural network is noted F: $\mathbb{R}^n \to \mathbb{R}^m$ where $n=|I|$ is the number of input neurons and $m=|O|$ is the number of output neurons.

Examples of Neural Network Training

Given the topology of a feed forward neural network, and given its activation function(s), the goal of the neural network training step is to compute the weight mapping $w:U \to \mathbb{R}$. For this purpose, a set of training patterns is needed. A training pattern is a couple $((t_x)_{x \in I},(z_y)_{y \in O}) \in \mathbb{R}^n \times \mathbb{R}^m$. This couple represents the output data $(z_y)_{y \in O}$ that the neural network is supposed to compute when fed with the input data $(t_x)_{x \in I}$. Input and output are computed by other means and they are used for teaching "if the input is $(t_x)_{x \in I}$, then the neural network must output $(z_y)_{y \in O}$".

Given a set of k training patterns $((t_x^i)_{x \in I},(z_y^i)_{y \in O})$, $i=1, \ldots, k$ a dedicated algorithm may be used to adjust the weight mapping in such a way that $F((t_x^i)_{x \in I})$ is as close as possible to $(z_y^i)_{y \in 0}$ for i=1, ..., k. Typical algorithm for this purpose is the back propagation. From the mathematical point of view, this is an interpolation problem that computes the mapping F.

Figure 6:
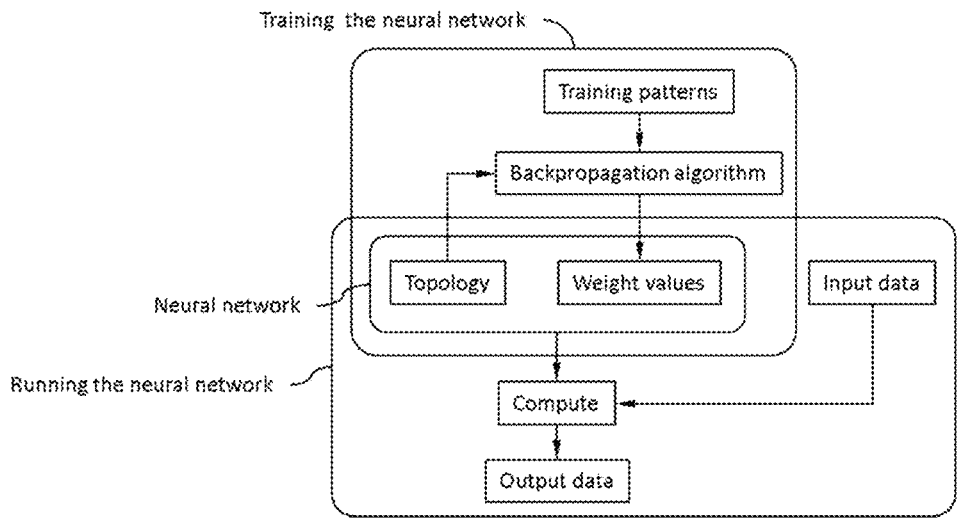

FIG. 6 illustrates the training step vs. running step of the neural network.

Examples of Training a Classification Neural Network

Neural networks may particularly be used for classification. Given a finite set of $N_{Class}$ classes of 3D objects, the goal is for the neural network to recognize to which class an unknown input 3D object belongs. A classification neural network features one output neuron per class. The numerical output value is a vector $(\lambda_1, \ldots, \lambda_{N_{Class}})$ of $N_{Class}$ numbers in interval [0,1]. Each number $\lambda_i$ is the probability for the input object to belong to class number i. A typical training pattern is a known input 3D object that belongs to class number i associated with an output vector such that $\lambda_j=0$ if $j \neq i$ and $\lambda_i=1$.

Examples of Building Training Patterns with the Provided Method for Forming a Dataset Once the $N_{Class}$ classes $C_j$, j=1, ... $N_{Class}$ of physical 3D objects are defined, the user may be in charge of defining the characteristic parameters together with their constraints. The Parameter/Class table captures the respective ranges of parameters values corresponding to respective classes. In addition, the user may design the 3D CAD template model (named the template model in the following). Finally, the user may define the $N_{Render}$ rendering parameters. A rendering parameter is a tuple including all necessary data to compute an image: viewpoint, lighting, ambiance, background, etc.

All steps of the subsequent process may be fully automatic. For each class i∈{1, ..., $N_{Class}$}, the system may generate one design table, each design table potentially representing a plurality of $N_{Conf}^i$ objects. Then, the system may combine each design table with the template model, which generates a total of $N_{3D}=\Sigma_{i=1}^{NClass} N_{Conf}^i$ 3D models. Finally, the system may generate $N_{Render}$ 2D images of each 3D model according to rendering definitions. This results in $N_{Image}=N_{3D}N_{Render}$ images. The dataset is made of $N_{Image}$ couples $(I_{i,j,k},(\lambda_1, \ldots, \lambda_{N_{Class}}))$ such that, for each i=1, ..., $N_{Class}$, for each j=1, ..., $N_{Conf}^i$ and for each k=1, ..., $N_{Render}$, $I_{i,j,k}$ is a 2D image of an object of class $C_i$ in the configuration number j according to rendering number k, $\lambda_j=0$ if $l \neq i$ and $\lambda_i=1$.

Figure 7:
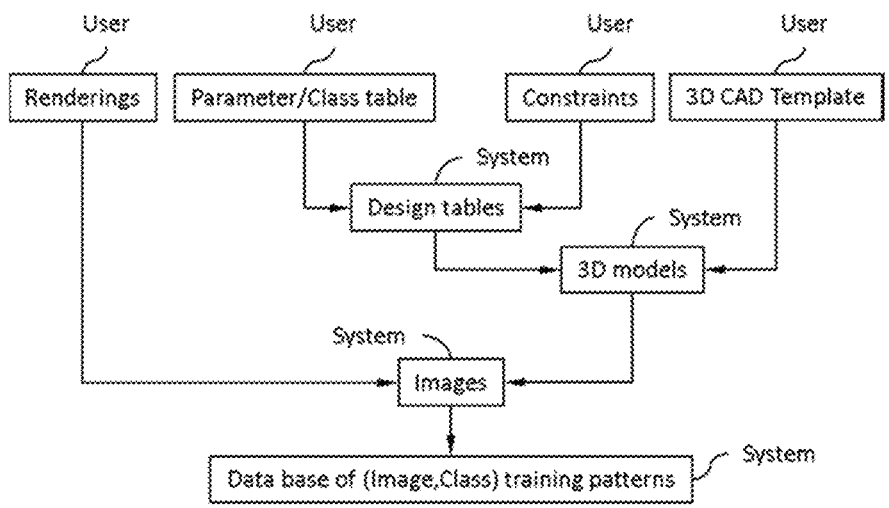

The workflow is represented on FIG. 7.

Examples of Classes of Objects

The first step for designing the training patterns may be to define the classes of objects to recognize. They may all derive from the same root class. A typically root class is "Table" and classes are arranged from the functional point of view, typically "dining table", "end table", "console table", "accent table" and "bar table".

Figure 8:
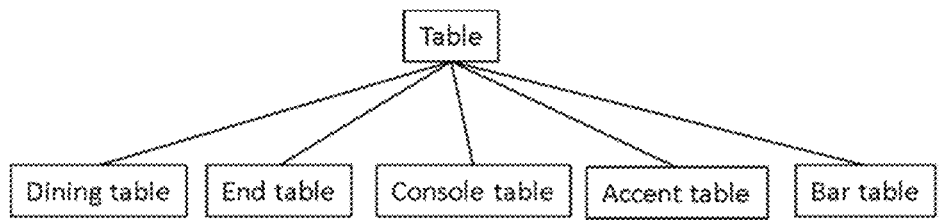

This is represented on FIG. 8.

Examples of Parameter/Class Table, Parameters Ranges

Characteristic parameters and typical (ranges of) values may be associated with classes of this functional organization. This may include numerical as well as symbolic values. Several kinds of parameters may be involved: dimensional parameters, style parameters and texture parameters. A dimensional parameter may be a length or an angle. A style parameter may govern the nature of one or more components of the object. A texture parameter may govern the look of the object depending on its material.

In FIGS. 9-11, Leg and Plate are style parameters. Value Circular (resp. Square) of parameter Leg means a central leg of the table with a circular (resp. Square) basis. Value 4 of parameter Leg means a table equipped with four vertical legs. Value Circular (resp. Rectangle, Oval) of parameter Plate means a circular (resp. rectangular, oval) shape of the plate.

Parameters names, types and ranges are gathered in a so-called "parameter/class table", a simplification of which is provided in Table I.

TABLE I

Simplified view of parameter/class table for tables classes: "Dining table" class, "End table" class, "Accent table" class, "Bar table" class and "Console table" class

| | | Class | | | | |
|---|---|---|---|---|---|---|
| | | Dining table | End table | Accent table | Bar table | Console table |
| Number of random configurations | | $M_{Dining}=3$ | $M_{End}=10$ | $M_{Accent}=10$ | $M_{Bar}=15$ | $M_{Console}=6$ |
| Dimensio | Height* | 75 | 50 | 60 | 80 | 75 |
| | Length* | [100, 200] | [80, 120] | [35, 45] | | [100, 150] |
| | Width* | [60, 110] | [60, 110] | [35, 45] | | [40, 60] |
| Shape | Leg | {Circular, Square, 2, 4} | | | | |
| | Plate | {Circular, Rectangle, Square, Oval} | | | | Rectangle |
| Texture | LegTexture | {Metal, Wood} | | | | |
| | PlateTexture | {Laminated, Wood, Glass, Metal} | | | | |

In addition, a number $M_{ClassName}$ of so-called "random configurations" may be associated with each class. Parameters labeled with an upper * are named "randomized parameters". Other parameters are named "traversed parameters". These two features may be used when generating design tables, as explained later.

This table may be formalized as follows. Given the set of classes C and given the set of parameters P, the parameter/class table is a mapping Range from P×C to the power set of a set Z noted $\mathcal{P}(Z)$ $$\text{Range}: P \times C \to \mathcal{P}(Z)$$

In the example:
C={Accent,Bar,Console,Dining,End}
P={Height,Length,Width,Leg,Plate,LegTexture,PlateTexture}
Z=$\mathbb{R}\cup$ {Circular,Square,2,4,Rectangle,Oval,Metal,Wood,Laminated,Glass}

For each couple (p,c)∈P×C, Range(p,c) is the range of parameter p when used to parameterize class c. The range of a style parameter may always be a finite set. The range of a dimensional parameter can be a finite set or an interval of numbers.

For example, Range(Length,End)=[80,120] means that the length of an end table is larger that 80 cm and smaller than 120 cm. Style parameters are {Leg,Plate}. Dimensional parameters are {Height,Length,Width}. Texture parameters are {LegTexture,PlateTexture}.

Examples of Traversed Parameters Vs. Random Parameters

The traversed/random status of parameters is set by the designer of the training patterns dataset. By definition, all possible combinations of traversed parameters are generated when building the design tables. Conversely, a predefined number of values are randomly selected for setting the random parameters in the design tables.

A principle may be that parameters that highly contribute to the shape of the 3D object should be traversed parameters while parameters that do not contribute so much to the shape should be random parameters. Typically, style parameters may be traversed parameters while dimensional parameters may be random parameters. Notice that traversing a parameter with a numerical interval range [a,b] implies sampling it because of its infinite set of values. In such a case, the range cannot be fully-traversed.

The discussed implementations consider traversed style parameters and random dimensional parameters, but random style parameters and traversed dimensional parameters are allowed as well. Texture parameters can be traversed or random, depending on the user's choice.

Examples of Constraints

Parameters dependencies may be captured by using e.g. two types of constraints: the proportionality constraint and the condition/action constraint. The proportionality states that the value of a numerical parameter is proportional to the value of another numerical parameter. For example Length:= 1.618*Width is a typical proportionality constraint. It is oriented in the sense that Length value is set after Width value is set.

In the condition/action constraint, the condition involves a list of parameters and their respective values. Parameters involved in the condition of the constraint are named "condition parameters". Parameters involved in the action of the constraint are named "action parameters". The action activated by the constraint is to define the range of action parameters according to values of the condition parameters. For example, a typical condition/action constraint is:

If ((Leg=Circular) or (Leg=Square)) then (Range (Length):=[100,150])

It states that a table equipped with a central leg may not be too long. Condition parameter is Leg. Action parameter is Length.

Visibly, constraints may create parameters dependencies, but the responsibility of the user may be to avoid cyclic dependencies. As explained previously, the set of training patterns is exhaustive from the traversed parameters point of view. Conversely, it is randomly sampled from the random parameters point of view. For this reason, a constraint involving a random parameter as a condition parameter may not involve a traversed parameter as an action parameter. Design table generation may take benefit of this restriction, which is explained later.

In the context of the discussed implementations, constraints are expressed by using the protobuff language, as described in (as accessible at the priority date): developers-.google.com/protocol-buffers/.

Examples of Design Table

The design table concept is very popular in the CAD industry. It may be advantageously reused by the process. Given a list of parameters $p_i$, i=1, ..., m, given a list of sets $R_i$, i=1, ..., m which are the "parameters' ranges", and given a number n of so called configurations, a design table features n rows, named "configurations" and m columns named "parameters". It is noted $$(D(i, j))_{\substack{i=1,\ldots,n \\ j=1,\ldots,m}}$$

where D(i,j) is an element of range $R_j$. A configuration is a row of the design table that specifies a particular value for each parameter. The goal of a design table is to gather n variations of a given object in a compact structure. The raison d'être of a design table is to be combined with a parameterized 3D CAD model in such a way that the parameters of the design table are those of the CAD model. This way, each configuration potentially represents a version of a 3D object.

For example, a design table of n=4 configurations of dining tables involves m=5 parameters {Height,Length, Width,Leg,Plate} respectively associated with ranges 75, [100,200], [40,120], {Circular,Square,2,4} and {Rectangle, Oval} as illustrated in Table II.

TABLE II

| Configurations for the "dining table" class | | | | |
| --- | --- | --- | --- | --- |
| Height | Length | Width | Leg | Plate |
| 75 | 100 | 60 | Square | Rectangle |
| 75 | 120 | 65 | 4 | Oval |
| 75 | 100 | 80 | Circular | Circular |
| 75 | 200 | 110 | 4 | Rectangle |

FIG. 12 illustrates each configuration of the 3D object.

Examples of Ordering Parameters and Constraints

Since constraints create parameters dependencies, parameters may be set and constraints may be activated according to an appropriate ordering when building the design tables. This ordering may be computed by customizing a directed acyclic graph (DAG) topological order algorithm. Let K be the set of constraints and for each constraint k∈K, the set of condition parameters of constraint k is noted Cond(k) and the set of action parameters of constraint k is noted Act(k). The ordering is computed by using a directed graph G=(X, U,α,ω) capturing the parameters and constraints dependencies. This graph is defined as follows. Nodes X are constraints, condition parameters and action parameters. Formally, $$X = K \cup \left( \bigcup_{k \in K} \text{Cond}(k) \right) \cup \left( \bigcup_{k \in K} \text{Act}(k) \right)$$

Arcs are oriented from condition parameters to constraints and from constraints to action parameters. Formally, for all constraints k∈K and for each parameter x∈Cond(k) there is an arc u∈U starting at x and ending at k, meaning that α(u)=x and ω(u)=k; similarly, for each parameter y∈Act(k) there is an arc v∈U starting at k and ending at y, meaning that α(u)=k and ω(u)=y. By definition, an input arc (resp. output arc) of node x∈X is an arc u∈U ending (resp. starting) at x, that is ω(u)=x (resp. α(u)=x). A root node x has no input arc, that is $\omega^{-1}(x)=\emptyset$ or, equivalently, $|\omega^{-1}(x)|=0$. By definition, an output node y of a node x is an ending node of an output arc of node x. The set of output nodes of node x is $\omega(\alpha^{-1}(x))$. According to graph theory, there exists at least one root node in a directed acyclic graph.

For example, consider constraints $c_1$, $c_2$, $c_3$, traversed parameters c, d, e, random parameters $a^*$, $b^*$, $f^*$ and dependencies as defined in Table III.

TABLE III

| | Parameter dependencies | |
|---|---|---|
| | Cond(•) | Act(•) |
| $c_1$ | {b *, c} | {a *} |
| $c_2$ | {d, e} | {c, f *} |
| $c_3$ | {d, e} | {b *, c} |

Figures 13, 14, 15, 16:
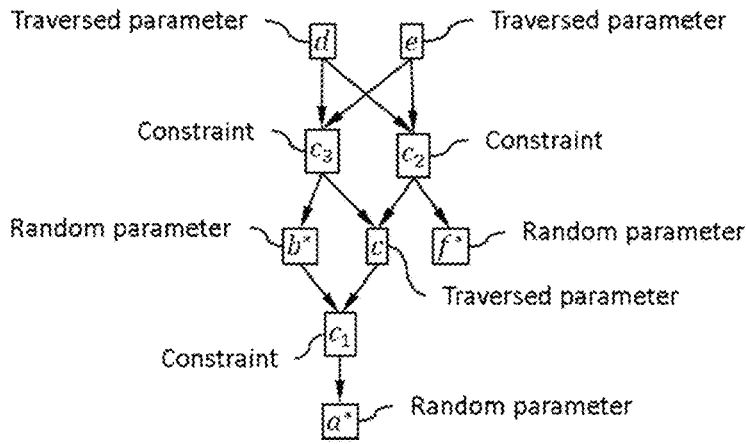

The corresponding graph is illustrated in FIG. 13.

The principle of the ordering algorithm may be to iteratively (and virtually) remove root nodes of the graph while recording the removing sequence. For this purpose, each node x∈X is associated with an integer number p(x) representing its current number of input arcs and which is initialized by the initial number of input arcs, that is $p(x):=|\omega^{-1}(x)|$. This way, a root node x is such that p(x)=0. The output of the algorithm may be a mapping q:{1, . . . , |X|}→X saying that the i-th node in the sequence is q(i). The algorithm may make use of the set of current root nodes defined by RootNodes={x∈X;p(x)=0}.

```
01      i:=0
02      While RootNodes ≠ Ø do begin
03          Select x ∈ RootNodes
04          p(x):= − 1
05          i:=i + 1
06          q(i):=x
07          For all output nodes of x, that is all
                y ∈ ω(α⁻¹(x))do begin
08              p(y):=p(y) − 1
09          End For
10      End while
```

Instruction 03 selects the appropriate current root node to remove. The selection is done according to the following priorities: select first a traversed parameter, if there is no traversed parameter, select a constraint, and otherwise select a random parameter.

It must be understood that this algorithm makes no distinction between parameters and constraints. It provides an ordering for setting parameters values and activating constraints.

The initial data structures p(•) and q(•) of the example may be as follows. Root nodes are d and e so that the initial RootNodes set is RootNodes={d,e} and table q(•) is unset. This is shown on FIG. 14

Successive states of the data structure through the while loop of the algorithm are as shown on FIG. 15.

Notice that step 4 preferably selects the constraint root node $c_3$ as opposed to random parameter root node $f^*$. Similarly, step 5 preferably selects traversed parameter root node c as opposed to random parameter root nodes $b^*$ or $f^*$. This is shown on FIG. 16.

After step 6 all traversed parameters may be inserted in the ordering. The very last step completes the total ordering, which is:

d-e-$c_2$-$c_3$-c-$b^*$-$f^*$-$c_1$-$a^*$

Figures 17, 18, 19, 20:
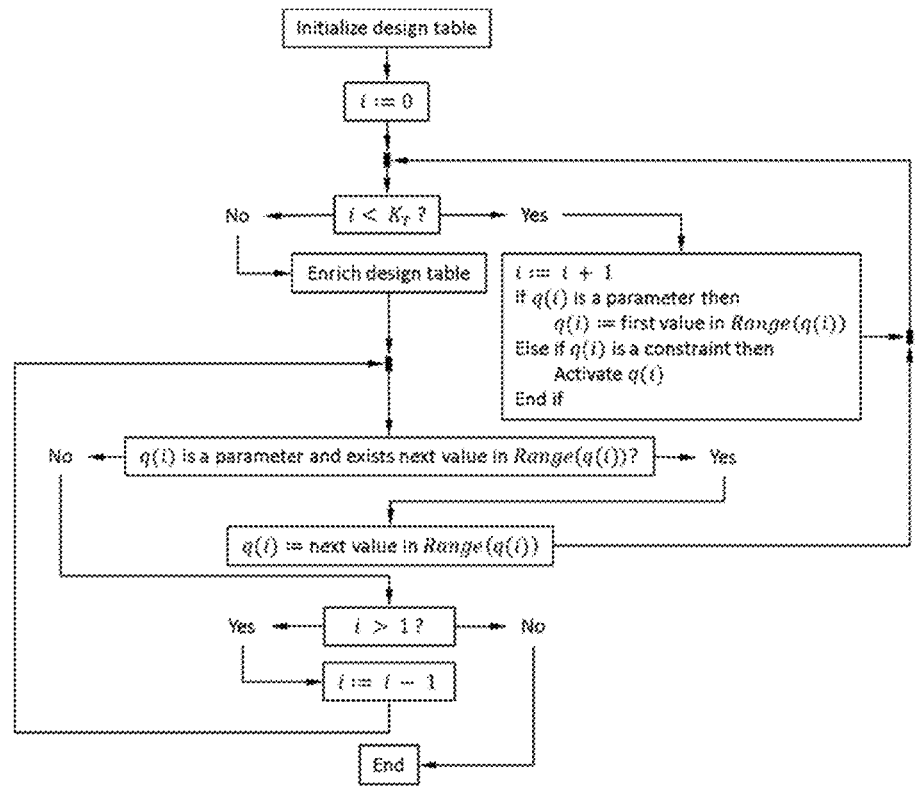
Figure 21:
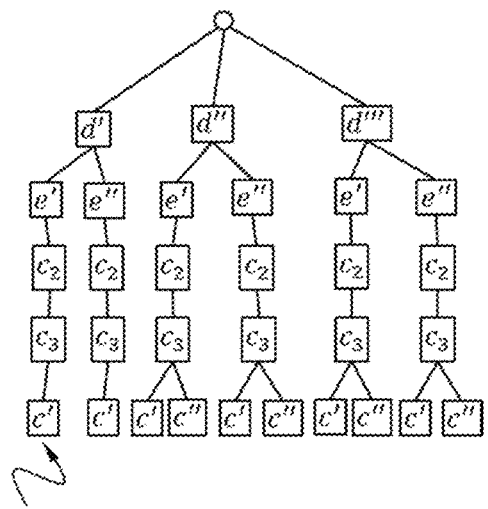

Formally, it is captured in table q(•) by q(1)=d, q(2)=e, q(3)=$c_2$ up to q(9)=$a^*$ as illustrated in FIG. 17.

Later, when building a design table, this ordering may be interpreted as follows.

1. Set parameter d.
2. Set parameter e.
3. Activate constraint $c_2$, which defines the respective ranges of parameters c and $f^*$.
4. Activate constraint $c_3$, which defines the respective ranges of parameters $b^*$ and c.
5. Set parameter c.
6. Set parameter $b^*$.
7. Set parameter $f^*$.
8. Activate constraint $c_1$, which defines the range of parameter $a^*$.
9. Set parameter $a^*$.

As expected, each parameter is set after its range is updated and each constraint is activated after all its condition parameters are set. In addition, thanks to the constraint specification and to the root node selecting priority, the ordering involves all traversed parameters in a leftmost subsequence d-e-$c_2$-$c_3$-c from step 1 to step 5. The remaining rightmost subsequence $b^*$-$f^*$-$c_1$-$a^*$ involves all random parameters.

Nevertheless, it should be noticed that the range of parameter c is set for the first time at step 3 and redefined at step 4. The value of parameter c is set at step 5 according to the range set at step 4 by constraint $c_3$. Clearly, the order of constraints in the initial structure p(•) influences the output values of parameters. Indeed, consider table p(•) where constraint $c_3$ is before constraint $c_2$, as illustrated in FIG. 18.

In this situation, the resulting sequence is d-e-$c_3$-$c_2$-c-$b^*$-$f^*$-$c_1$-$a^*$ meaning that parameter c is set at step 5 according to the range defined by constraint $c_2$ at step 4. This phenomenon is unavoidable, and the responsibility of the user is to organize table p(•) in such a way that the ordering algorithm yields the expected sequence.

Examples of Generating Design Tables

Design tables generation governs the diversity of the training pattern and thus the efficiency of the neural network, after the training is performed. For each class of objects, the algorithm generates one design table. It is built in order to cover all possible combinations of traversed parameters values. Conversely, random values are selected for setting random parameters. The inputs are: the parameter/class table, the constraints and the ordered sequence q(•). The overall algorithm may be as follows.

```
For each class C_k , k = 1,...,N_Class do begin
    Using the parameter/class table, set ranges of
    parameters
    Generate the design table for class C_k
End for
```

Given a class $C_k$, the design table generation algorithm may be based on an exhaustive traversal of all traversed parameters values. For each combination of traversed parameters values, the design table is enriched with $M_k$ configurations and traversed parameters values are set with the said combination. Then, random parameters of the design table are set by selecting random values within their respective ranges. In the following, integer $K_T$ is the position of the rightmost traversed parameter in the ordering, as illustrated in FIG. 19.

The algorithm may be structured like a depth-first tree traversal, as shown on FIG. 20.

The "Initialize design table" step of FIG. 19 creates a design table $D_k(\bullet,\bullet)$ with zero line and one column for each parameter. For convenience, columns are indexed with parameters names. Expression $Size(D_k)$ refers to the number of lines of design table $D_k$ so that $$D_k(Size(D_k)-i,x)$$

is the value of parameter x in the configuration number $Size(D_k)-i$.

The "Enrich design table" step of FIG. 19 may be launched each time the tuple of traversed parameters is set with new values. It may be as follows.

```
For i:=1 to M_k do begin
    Add a new line to the design table D_k( •,• )
    For each traversed parameter x do begin
        D_k(Size(D_k),x):= current value of traversed
            parameter x
    End for
End for
```

Then, random parameters may be set according to the ordering, constraints activations and random sampling. Remember that |X| is the number of symbols in the ordering sequence.

```
For i:=Size(D_k) - M_k to Size(D_k) do begin
    For j:=K_T + 1 to |X| do begin
        If q(j) is a parameter then
            D_k(i,q(j)):=Random(Range(q(j)))
        Else if q(j) is a constraint then
            Activate q(j)
        End if
    End for
End for
```

The Random(Range(x)) instruction randomly selects a value within the range Range(x) of parameter x.

The algorithm is now explained with an example. The initial empty design table may be as on FIG. 21. The number of random configuration may be $M_k=3$.

TABLE IV

| Design table | | | | | |
|---|---|---|---|---|---|
| a* | b* | c | d | e | f* |

Respective ranges of traversed parameters are Range(d)={d',d'',d'''}, Range(e)={e',e''} and Range(c)={c',c''}. Furthermore, constraint $c_3$ says that if d=d' then Range(c)={c'}. Constraint $c_1$ is detailed later and $c_2$ does not need to be described. By using the d-e-$c_2$-$c_3$-c ordering, the (virtual) tree traversed by the algorithm may be as follows. It features 10 leaf nodes, each one defining a combination of traversed parameters values that is compatible with the constraints. This is shown on FIG. 21.

After the leftmost leaf node is visited, three configurations may be created, traversed parameters c,d,e are set according to the leftmost branch of the tree and random parameters a*,b*,f* are still unset.

TABLE IV

| Design table | | | | | |
|---|---|---|---|---|---|
| a* | b* | c | d | e | f* |
| 1 | | c' | d' | e' | |
| 2 | | c' | d' | e' | |
| 3 | | c' | d' | e' | |

Ranges of random parameters are Range(a*)=[10,40], Range(b*)=[10,30] and Range(f*)=[5,10]. Constraint $c_1$ says that If ((b*≥20) and (d=d')) then (Range(a*):=[10,20])

The design table may be completed with randomly selected random parameters according to the subsequence b*-f*-$c_1$-a*. For example, the first configuration of the design table may be obtained through:

1. b*:=22.67
2. f*:=6.51
3. Activate constraint $c_1$, which sets Range(a*):=[10,20] because b*>20.
4. a*:=12.23

So that:

TABLE V

| Design table | | | | | |
|---|---|---|---|---|---|
| a* | b* | c | d | e | f* |
| 1 | 12.23 | 22.67 | c' | d' | e' | 6.51 |
| 2 | | | c' | d' | e' | |
| 3 | | | c' | d' | e' | |

Repeating the same process for each configuration leads to the design table:

TABLE VI

| Design table | | | | | |
|---|---|---|---|---|---|
| a* | b* | c | d | e | f* |
| 1 | 12.23 | 22.67 | c' | d' | e' | 6.51 |
| 2 | 34.19 | 18.79 | c' | d' | e' | 6.18 |
| 3 | 26.85 | 11.12 | c' | d' | e' | 5.43 |

Figure 22:
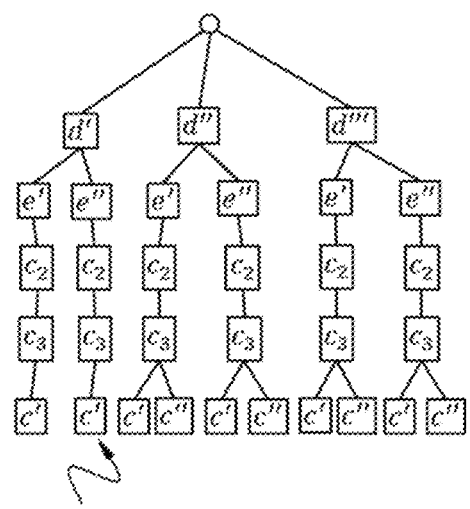

Now, the next leaf node is visited, as illustrated in FIG. 22.

Three additional configurations may be added to the design table and traversed parameters may be set according to the visited branch.

TABLE VII

| Design table | | | | | |
|---|---|---|---|---|---|
| a* | b* | c | d | e | f* |
| 1 | 12.23 | 22.67 | c' | d' | e' | 6.51 |
| 2 | 34.19 | 18.79 | c' | d' | e' | 6.18 |
| 3 | 26.85 | 11.12 | c' | d' | e' | 5.43 |
| 4 | | | c' | d' | e'' | |

TABLE VII-continued

| | | Design table | | | |
|---|---|---|---|---|---|
| a * | b * | c | d | e | f * |
| 5 | | c' | d' | e''' | |
| 6 | | c' | d' | e''' | |

Random parameters may be set by randomly selecting values in appropriate ranges according to the ordering.

TABLE VIII

| | | Design table | | | |
|---|---|---|---|---|---|
| a * | b * | c | d | e | f * |
| 1 | 12.23 | 22.67 | c' | d' | e' | 6.51 |
| 2 | 34.19 | 18.79 | c' | d' | e' | 6.18 |
| 3 | 26.85 | 11.12 | c' | d' | e' | 5.43 |
| 4 | 21.32 | 12.52 | c' | d' | e''' | 5.15 |
| 5 | 28.02 | 15.06 | c' | d' | e''' | 7.38 |
| 6 | 4.65 | 10.20 | c' | d' | e''' | 9.05 |

The process may continue until the tenth leaf node is visited. The resulting design table includes thirty configurations.

Examples of Template 3D CAD Model

The template 3D CAD model is a parameterized 3D model including solids with dimensions, parameters, formulas and constraints. Parameters' names are those of the parameter/class table. The template model is designed by a skilled user in such a way that, by setting appropriate values to parameters, it is potentially able to create the 3D geometry of any object of any class. Logically, the name of this template model is the root class name. CATIA® system of Dassault-Systèmes provides this capability.

3D Models, Images and Training Patterns

Inserting a design table into a template model automates the production of 3D models. Indeed, selecting a row of the inserted design table makes it the active configuration, which sets parameters of the template model with the configuration's values. Updating the geometry computes the shape of the 3D object. CATIA® system of Dassault-Systèmes provides this capability.

```
Read the template model
    For each class C_k , k = 1,...,N_Class do begin
        Set the output vector (λ_1,...,λ_NClass) with λ_k = 1 and λ_n
            = 0 if n ≠ k
        Replace the existing design table by design table
            D_k in the template model
        For i:=1 to Size(D_k) do begin
            Set the i-th configuration as the active
                configuration
            Update the geometry
            Get the resulting 3D model S
            For j:=1 to N_Render do begin
                Compute image I of S according to
                    rendering number j
                Store (I,(λ_1,...,λ_NClass)) in the data base of
                    training patterns
            End for
        End for
    End for
```

FIGS. 23-26 illustrate an example of defining a parametric model for classes of sofas.

Figure 23:
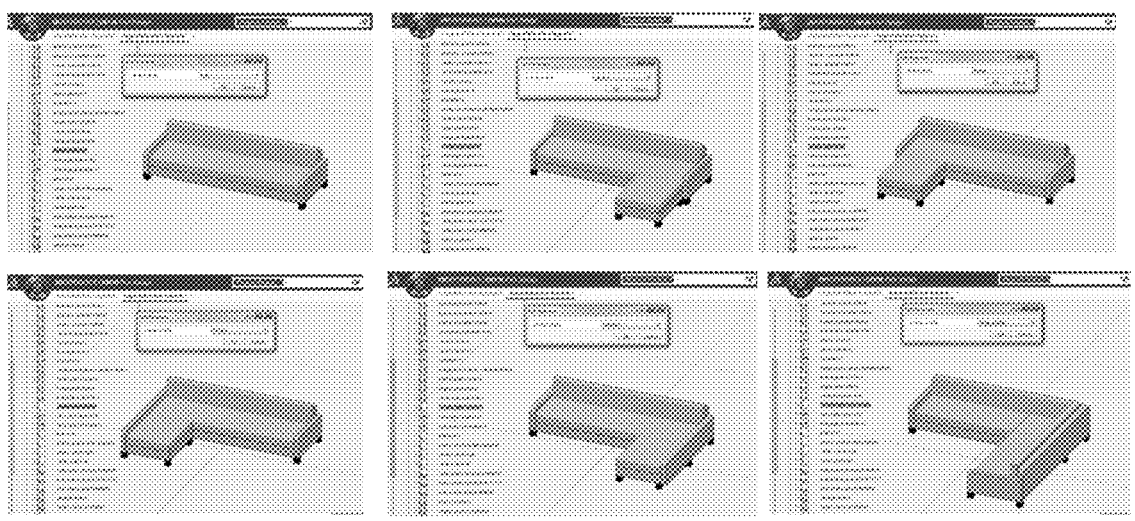
FIGS. 23, 24, 25, and 26 illustrate an example of defining a parametric model.
Figure 24:
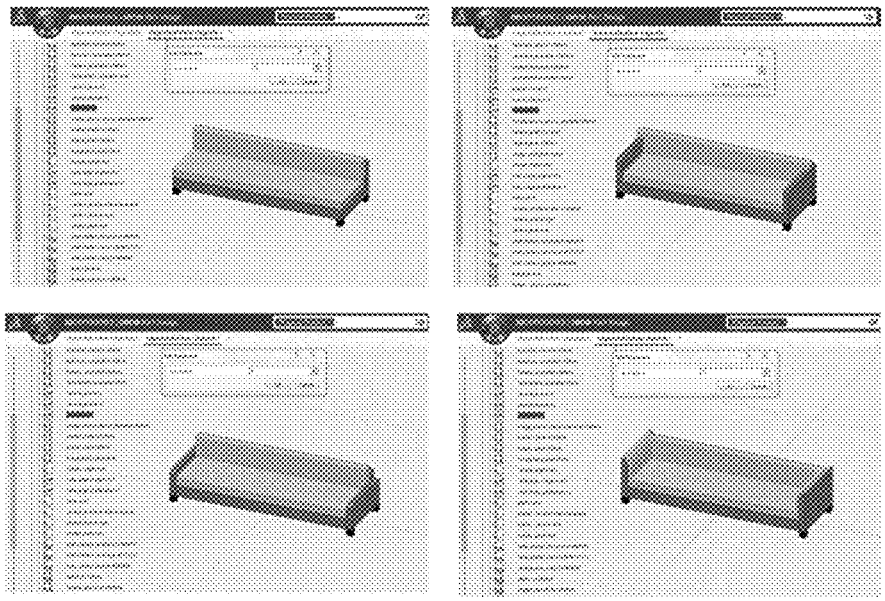
Figure 25:
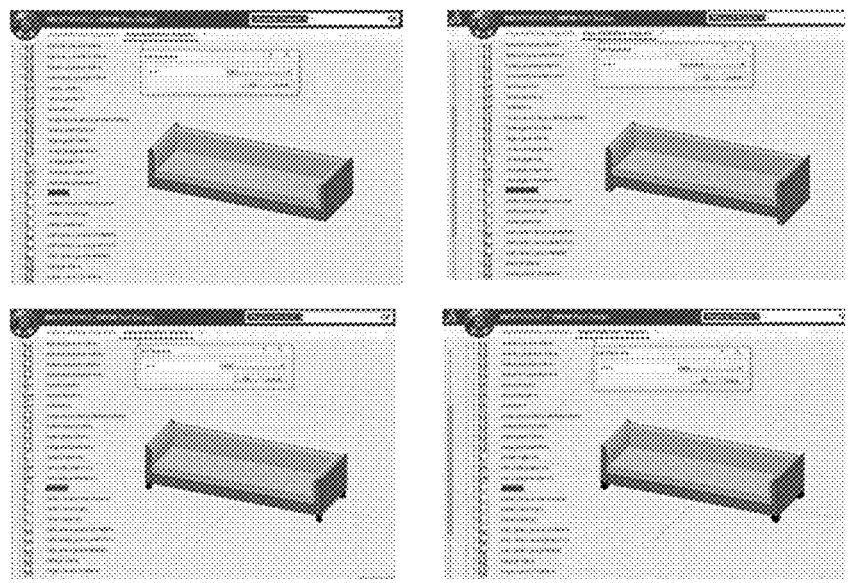
Figure 26:
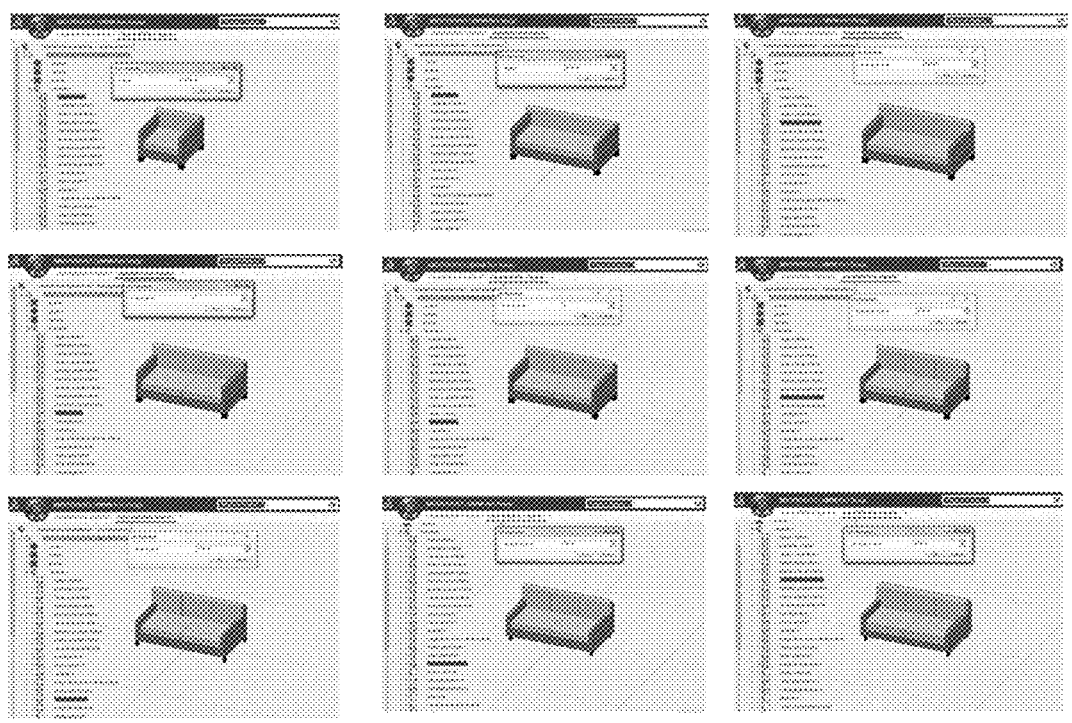

An upper class of sofas may comprise a couch subclass. Defining the couch class may comprise defining an "angle_sofa" style parameter which may have a range of six values: "no", "right", "left", "right+", "left+" and "double". These values are illustrated by FIG. 23. An "armrest" style parameter may further be defined with different values providing a number of armrests, the range being for example: {0;1;2;3}. These range values are represented on FIG. 24. A "base" style parameter may further provide the type of base, the range having for example four values: "none", "armrests", "round", "square". These range values are represented on FIG. 25. The couch class may further comprise dimensional parameters. FIG. 26 shows different instances with different dimensional parameter values. The couch class may further comprise texture parameters, providing for examples lists of materials for different components. Once all parameters and their ranges are declared, defining the parametric model may comprise defining a function that produces 3D modeled objects with parameter values as inputs. The way to define such a function is straightforward in view of the parameters as defined above. The process may also optionally comprise defining constraints between the parameters.

Other furniture classes may be defined in a similar way. Table IX provides parameters for different furniture classes, which allow creating efficiently diverse datasets for these classes. Style parameters may be labeled as to be traversed. Dimensional and texture parameters may be (e.g. labeled as to be) randomized.

TABLE IX

| | | | Parameters for different furniture classes | |
|---|---|---|---|---|
| Upper classes | Classes | style parameters | dimensional parameters | texture parameters |
| table | dining | type_plate | Height | material_plate |
| | low | type_leg | Length | material_legs |
| | bar | | Width | |
| | console | | thickness_plate | |
| | pedestal | | Ovethickness | |
| | | | width_pedestal | |
| | | | height_pedestal | |
| | | | thickness_leg | |
| | | | margin_leg_border | |
| | | | number_leg_star | |
| | | | ratio_fillet | |

TABLE IX-continued

Parameters for different furniture classes

| Upper classes | Classes | style parameters | dimensional parameters | texture parameters |
|---|---|---|---|---|
| sofa | armchair<br>Couch<br>day_bed | angle_sofa<br>armrest<br>base | Width<br>Depth<br>sitting_height<br>backrest_height<br>backrest_thickness<br>cushion_thickness<br>armrest_thickness<br>armrest_height<br>armrest_front_position<br>backrest_cushion<br>sitting_cushion<br>front_back_cushion_margin<br>leg_height<br>leg_width<br>margin_leg_border<br>ratio_angle_width<br>ratio_angle_depth | material_sofa_structure<br>material_sofa_legs<br>material_sofa_cushion |
| storage furniture | cabinet<br>dresser<br>bedside<br>library<br>shelf<br>TV table<br>buffet | number_legs<br>number_sides | Door<br>Depth<br>Width<br>Height<br>side-thickness<br>shelf_thickness<br>top_thickness<br>base_thickness<br>leg_height<br>leg_thickness<br>shelf_number<br>bottom_thickness<br>top_extension<br>base_extension<br>ratio_size_door_shelf_height<br>ratio_size_door_side_thickness<br>top_drawer_block<br>center_drawer_block<br>bottom_drawer_block<br>door_drawer_extension<br>bottom_guard<br>top_guard<br>number_drawers_per_block<br>number_drawers_per_block_center<br>ratio_chamfer_base<br>ratio_chamfer_top<br>ratio_fillet_top_bottom<br>ratio_fillet_base_top<br>ratio_fillet_top_bottom<br>ratio_fillet_base | texture_structure<br>texture_porte_tiroir<br>texture_pied |
| lamps | floor lamp<br>table lamp<br>suspended lamp | type_body<br>type_head<br>type_base | height_body<br>diameter_body<br>height_head<br>diameter_head<br>base_diameter_length_width<br>leg_height<br>head_angle_degree | material_body<br>material_head<br>material_base |

The invention claimed is:

1. A computer-implemented method for forming a dataset configured for learning a function, the function taking as inputs images of instances of one or more classes of mechanical parts, the method comprising:

for each class:
obtaining a parametric model of the class of mechanical parts, the parametric model being a parameterized template of the class created by a user with a computer-aided design system, the parametric model including a set of ranges each of a respective one of a set of parameters, the set of parameters including one or more style parameters and one or more dimensional parameters, the style parameter including a semantic descriptor of a discriminative feature of a mechanical part of the class, the parametric model being a function that produces 3D modeled objects with parameter values as inputs and being configured to generate a respective 3D modeled object that represents a respective instance of the class with a respective set of values provided in the set of ranges;

generating a plurality of 3D modeled objects each representing an instance of the class of mechanical parts with the parametric model by automatically varying parameter values, the generating including visiting each value of one or more of the set of ranges thereby traversing the one or more of the set of ranges, the one or more parameters of which ranges are traversed including style parameters, the generating further including sampling the ranges of the one of more dimensional parameters; and adding to the dataset, for each one of the plurality of 3D modeled objects each representing an instance of the class of mechanical parts, one or more corresponding images, wherein the dataset includes, for each value of each style parameter, at least one image corresponding to a 3D modeled object that has been generated by inputting said value to the parametric model, and wherein at least one value of each range of each dimensional parameter is such that the dataset includes no image corresponding to a 3D modeled object that has been generated by inputting said value to the parametric model.

2. The method of claim 1, wherein the set of parameters includes one or more characteristic parameters.

3. The method of claim 2, wherein the one or more of the set of ranges that are traversed are each of a respective characteristic parameter.

4. The method of claim 1, wherein the generating includes randomizing other one or more of the set of ranges.

5. The method of claim 4, wherein the randomizing includes, for each combination of values of the one or more of the set of ranges that are not randomized, providing a number of combinations of random values for the randomized ranges, the number of combinations being predetermined to the class.

6. The method of claim 1, wherein the parametric model further includes one or more constraints each linking respective parameters together, the one or more constraints including one or more of: a proportionality constraint, a condition constraint, and an action constraint, wherein the condition constraint includes a set of condition constraint parameters, and wherein the action constraint includes a set of action constraint parameters.

7. The method of claim 6, wherein the generating is performed according to an ordering defined on the set of parameters giving priority to the one or more of the set of ranges that are traversed and based on the one or more constraints.

8. The method of claim 7, wherein the ordering is defined according to an oriented sequence of nodes connected on a graph starting from a root node, the graph comprising a set of nodes and arcs, with nodes of the graph being defined from the one or more constraints and the set of condition parameters, with arcs of the graph being oriented from condition constraint parameters to constraints and from constraints to action constraint parameters, the set of nodes including at least one root node, the root node having no arcs oriented from any node to the root node, the ordering being defined from the sequence resulting from the sequence of nodes connected through arcs oriented from the root node.

9. The method of claim 1, wherein the semantic descriptor comprises natural language words.

10. The method of claim 1, wherein the parametric model of the class of mechanical parts further comprises sub-models, each sub-model being a respective parametric model including a respective set of ranges each of a respective parameter of a respective set of parameters, the respective set of parameters including one or more respective style parameters and one or more respective dimensional parameters.

11. A computer-implemented method for defining a parametric model of a class of real objects configured for forming a dataset configured for learning a function, the function taking as inputs images of instances of one or more classes of mechanical parts, the method comprising:

for each class and in the forming:
obtaining a parametric model of the class of mechanical parts, the parametric model being a parameterized template of the class created by a user with a computer-aided design system, the parametric model including a set of ranges each of a respective one of a set of parameters, the set of parameters including one or more style parameters and one or more dimensional parameters, the style parameter including a semantic descriptor of a discriminative feature of a mechanical part of the class, the parametric model being a function that produces 3D modeled objects with parameter values as inputs and being configured to generate a respective 3D modeled object that represents a respective instance of the class with a respective set of values provided in the set of ranges, generating a plurality of 3D modeled objects each representing an instance of the class of mechanical parts with the parametric model by automatically varying parameter values, the generating including visiting each value of one or more of the set of ranges thereby traversing the one or more of the set of ranges, the one or more parameters of which ranges are traversed including style parameters, the generating further including sampling the ranges of the one of more dimensional parameters, and adding to the dataset, for each one of the plurality of 3D modeled objects each representing an instance of the class of mechanical parts, one or more corresponding images;

defining the set of parameters and, for each parameter, the respective range; and labeling one or more ranges as to be traversed when forming the dataset, wherein the dataset includes, for each value of each style parameter, at least one image corresponding to a 3D modeled object that has been generated by inputting said value to the parametric model, and wherein at least one value of each range of each dimensional parameter is such that the dataset includes no image corresponding to a 3D modeled object that has been generated by inputting said value to the parametric model.

12. The method of claim 11, wherein the method further comprises:

defining one or more constraints each linking respective parameters together, and optionally defining an ordering on the set of parameters giving priority to the one or more of the set of ranges that are traversed and based on the one or more constraints.

13. A non-transitory memory having stored thereon a computer program including instructions for performing a computer-implemented method for forming a dataset configured for learning a function, the function taking as inputs images of instances of one or more classes of mechanical parts, the method comprising:

for each class:
obtaining a parametric model of the class of mechanical parts, the parametric model being a parameterized template of the class created by a user with a computer-aided design system, the parametric model including a set of ranges each of a respective one of a set of parameters, the set of parameters including one or more style parameters and one or more dimensional parameters, the style parameter including a semantic descriptor of a discriminative feature of a mechanical part of the class, the parametric model being a function that produces 3D modeled objects with parameter values as inputs and being configured to generate a respective 3D modeled object that represents a respective instance of the class with a respective set of values provided in the set of ranges;

generating a plurality of 3D modeled objects each representing an instance of the class of mechanical parts with the parametric model by automatically varying parameter values, the generating including visiting each value of one or more of the set of ranges thereby traversing the one or more of the set of ranges, the one or more parameters of which ranges are traversed including style parameters, the generating further including sampling the ranges of the one of more dimensional parameters; and adding to the dataset, for each one of the plurality of 3D modeled objects each representing an instance of the class of mechanical parts, one or more corresponding images, wherein the dataset includes, for each value of each style parameter, at least one image corresponding to a 3D modeled object that has been generated by inputting said value to the parametric model, and wherein at least one value of each range of each dimensional parameter is such that the dataset includes no image corresponding to a 3D modeled object that has been generated by inputting said value to the parametric model.

14. A device comprising:
a processor; and
the non-transitory computer readable memory according to claim 13,
wherein the processor is coupled to the non-transitory computer readable medium.

15. A non-transitory memory having stored thereon a computer program including instructions for performing a computer-implemented method for defining a parametric model of a class of real objects configured for forming a dataset configured for learning a function, the function taking as inputs images of instances of one or more classes of mechanical parts, the method comprising:

for each class and in the forming:
obtaining a parametric model of the class of mechanical parts, the parametric model being a parameterized template of the class created by a user with a computer-aided design system, the parametric model including a set of ranges each of a respective one of a set of parameters, the set of parameters including one or more style parameters and one or more dimensional parameters, the style parameter including a semantic descriptor of a discriminative feature of a mechanical part of the class, the parametric model being a function that produces 3D modeled objects with parameter values as inputs and being configured to generate a respective 3D modeled object that represents a respective instance of the class with a respective set of values provided in the set of ranges, generating a plurality of 3D modeled objects each representing an instance of the class of mechanical parts with the parametric model by automatically varying parameter values, the generating including visiting each value of one or more of the set of ranges thereby traversing the one or more of the set of ranges, the one or more parameters of which ranges are traversed including style parameters, the generating further including sampling the ranges of the one of more dimensional parameters, and adding to the dataset, for each one of the plurality of 3D modeled objects each representing an instance of the class of mechanical parts, one or more corresponding images;

defining the set of parameters and, for each parameter, the respective range; and labeling one or more ranges as to be traversed when forming the dataset, wherein the dataset includes, for each value of each style parameter, at least one image corresponding to a 3D modeled object that has been generated by inputting said value to the parametric model, and wherein at least one value of each range of each dimensional parameter is such that the dataset includes no image corresponding to a 3D modeled object that has been generated by inputting said value to the parametric model.

16. A device comprising:
a processor; and
the non-transitory memory according to claim 15,
wherein the processor is coupled to the non-transitory computer readable medium.

* * * * *